United States Patent [19]

Robertson et al.

[11] Patent Number: 4,834,306

[45] Date of Patent: May 30, 1989

[54] FILM CASSETTE

[75] Inventors: Jeffrey C. Robertson, Rochester; Mark D. Fraser, Brockport, both of N.Y.

[73] Assignee: Eastman Kodak Company, Rochester, N.Y.

[21] Appl. No.: 173,396

[22] Filed: Mar. 25, 1988

[51] Int. Cl.⁴ .............................................. G03B 17/26
[52] U.S. Cl. .................................. 242/71.1; 242/71.9; 354/275
[58] Field of Search ............................... 242/71–71.2, 242/71.8, 71.9; 354/275

[56] References Cited

U.S. PATENT DOCUMENTS

| | | | |
|---|---|---|---|
| 988,341 | 4/1911 | Hill | 242/ |
| 2,541,476 | 2/1951 | Mihalyi | 242/ |
| 3,234,024 | 2/1966 | Leinonen | 242/ |
| 3,659,799 | 5/1972 | Cerutti et al. | 242/ |
| 3,677,499 | 7/1972 | Wangerin | 242/ |
| 3,797,777 | 3/1974 | Hosono et al. | 242/ |
| 4,145,133 | 3/1979 | Wareham | 242/71.1 X |
| 4,407,579 | 10/1983 | Huff | 354/ |
| 4,423,943 | 1/1984 | Gold | 354/ |
| 4,445,768 | 5/1984 | Gold | 354/275 |

Primary Examiner—Stuart S. Levy
Assistant Examiner—Steven M. duBois
Attorney, Agent, or Firm—Roger A. Fields

[57] ABSTRACT

In a film cassette, a film spool is rotatable independently of a pair of coaxially spaced rotatable disks. The two disks have respective circumferential lips which prevent the outermost leader convolution of a film roll wound on the spool from clock-springing into contact with the cassette shell. When the spool is initially rotated, the disks may remain substantially stationary and the film roll, since its inner end is secured to the spool, tends to expand radially to ensure a non-slipping relation between the outermost leader convolution and the lips. Then, rotation of the spool must rotate the disks and stationary internal spreaders will deflect successive sections of the disks to an axial dimension exceeding the film width, thereby allowing corresponding sections of the outermost leader convolution to exit from the radial confinement of the lips. Stationary internal guides direct the freed end of the outermost leader convolution to the cassette opening. Sufficient film thrust is provided by the spool as it is rotated, to thread the film leader along a predetermined path from the cassette opening, particularly because the outermost leader convolution is kept out of contact with the cassette shell.

15 Claims, 3 Drawing Sheets

FILM CASSETTE

CROSS-REFERENCE TO A RELATED APPLICATION

Reference is made to commonly assigned copending U.S. application Ser. No. 173,393 entitled FILM CASSETTE, and filed Mar. 25, 1988 in the name of Robert P. Cloutier.

BACKGROUND OF THE INVENTION

1. Field of the Invention

The invention relates generally to the field of photography, and more particularly to a film cassette containing roll film.

2. Description of the Prior Art

In the standard 35 mm film manufacturers' cassette, such as manufactured by Eastman Kodak Co. and Fuji Photo Film Co., Ltd., the filmstrip is wound on a flanged spool which is rotatably supported within a cylindrical shell. A leading end section of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protuding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus rotation of the spool in the unwinding direction cannot serve to advance the filmstrip out of the shell, and it is necessary in the typical 35mm camera to engage the protruding leader section to draw the filmstrip out of the shell.

Representative patent art is as follows:

(a) U.S. Pat. No. 988,341, patented Apr. 4, 1911, discloses a film spool having a pair of coaxially spaced flanges between which a film and paper roll is wound on the spool to form alternating convolutions of photographic film and paper. The film and paper roll appears to be very tightly wound on the spool to prevent ambient light from reaching the successive film convolutions. Several dimples positioned on the respective undersides of the two flanges firmly secure the outermost film convolution and the outermost paper convolution in place to prevent their movement with respect to the dimples. This is done to maintain the tight winding of the roll. When the spool is loaded in a camera, it must be done in subdued light because the outermost film convolution and the outermost paper convolution have to be manually disengaged from the several dimples in order to secure the film and paper leading ends to a take-up means. However, disengagement of the outermost film and paper convolutions from the dimples might allow the roll to unwind or clock-spring about the spool. Thus the facility of the roll to light-shield the successive film convolutions would be lost.

(b) U.S. Pat. No. 3,797,777, patented Mar. 19, 1974, discloses a tape storage magazine containing a rotatable reel having a pair of coaxially spaced flanges between which a magnetic tape roll is tightly wound on the spool. The outermost tape convolution between the two flanges is connected to, though is spaced from, the innermost convolution of a wider stiffer leader tightly coiled at the circumferential edges of the flanges. A number of flexible fingers integrally formed with at least one of the flanges radially extend beyond the circumferential edge(s) of the flange(s) to transversely pinch the contiguous leader convolutions to prevent them from contacting the magazine wall. The forward end of the stiffer wider leader is positioned within the storage magazine and it slightly extends beyond the range of the flexible fingers. When the reel is rotated in an unwinding direction, the flexible fingers propel the outermost leader convolution past a stationary disengaging member to strip successive sections of the wider leader from engagement with the respective fingers. The flexible fingers where engaged with the contiguous leader convolutions serve to thrust the freed leader sections along a predetermined threading path from the storage magazine. However, since the tape leader must be grabbed by the flexible fingers with a sufficient force to thrust the freed leader sections along the threading path, it is possible that the fingers may damage the tape leader, in which instance a leader jam could result.

THE CROSS-REFERENCED APPLICATION

The cross-referenced application discloses an improved film cassette wherein a film spool when rotated in an unwinding direction automatically advances the filmstrip out of the cassette shell without damaging the filmstrip. With such an improvement, the prior art need for a protruding film leader is eliminated.

Specifically, there is disclosed an improved film cassette wherein a convoluted film roll is wound on a spool between a pair of coaxially spaced flanges of the spool. A plurality of rigid constraining projections fixed to the respective undersides of the flanges radially confine the outermost convolution of a widened film leader to prevent the film roll from radially expanding into contact with the cassette shell. The constraining projections are each arranged in a slipping relation with the outermost convolution of the widened leader to allow the outermost convolution to readily slide in contact with the constraining projections in order to facilitate a limited degree of radial expansion of the film roll. When the spool is rotated in an unwinding direction, the film roll will tend to expand radially since the inner end of the filmstrip is attached to the spool, and the spool will rotate the film roll in the unwinding direction. Successive sections of the outermost convolution of the widened leader will therefore be advanced past a stripper-guide which frees the leader sections from the radial confinement of respective ones of the constraining projections and guides the freed sections out of a cassette opening.

SUMMARY OF THE INVENTION

Like the invention in the cross-referenced application, the invention in this application advantageously provides an improved film cassette wherein a film spool when rotated in the unwinding direction automatically advances the filmstrip out of the cassette shell. With such an improvement, the prior art need for a protruding film leader is eliminated.

According to the invention, there is generally provided an improved film cassette wherein (a) a spool is rotatable in an unwinding direction within a cassette shell having a film passage slit and (b) a convoluted film roll wound on said spool tends to expand radially in response to initial rotation of the spool in an unwinding direction, and wherein the improvement comprises:

rotatable constraining means for radially confining an outermost convolution of said film roll to prevent the film roll from radially expanding substantially into contact with said shell, said constraining means being coaxially arranged with respect to said spool to permit independent rotation of the spool at least initially in the unwinding direction to tend to expand said film roll radially to ensure a non-slipping relation between said outermost convolution and said constraining means and thereby enable further rotation of said spool in the unwinding direction to similarly rotate the constraining means;

release means for freeing successive sections of said outermost convolution from the radial confinement of said constraining means as corresponding portions of the constraining means are rotated past said release means; and guide means for directing freed sections of said outermost convolution to said film passage slit.

Because the constraining means in the example of the improved cassette keeps the outermost convolution of the film roll out of contact with the cassette shell as the spool is rotated in the unwinding direction, and the constraining means is free to rotate when there exists a non-slipping relation between the outermost convolution and the constraining means, the spool during its rotation will serve to thrust the filmstrip from the shell. Thus the prior art need for a protruding film leader is eliminated.

Preferably, the invention is embodied in a film cassette that contains a film spool and a pair of coaxially spaced rotatable disks, the spool being rotatable independently of the disks. The two disks have respective circumferential lips which prevent the outermost leader convolution of a film roll wound on the spool from clock-springing into contact with the cassette shell. When the spool is initially rotated, the disks may remain substantially stationary and the film roll, since its inner end is secured to the spool, tends to expand radially to ensure a non-slipping relation between the outermost leader convolution and the lips. Then, rotation of the spool must rotate the disks and stationary internal spreaders will deflect successive sections of the disks to an axial dimension exceeding the film width, thereby allowing corresponding sections of the outermost leader convolution to exit from the radial confinement of the lips. Stationary internal guides direct the freed end of the outermost leader convolution to the cassette opening. Sufficient film thrust is provided by the spool as it is rotated, to thread the film leader along a predetermined path from the cassette opening. This is because the outermost leader convolution is kept out of contact with the cassette shell, and the disks are free to rotate when there exists a non-slipping relation between the outermost leader convolution and the lips.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
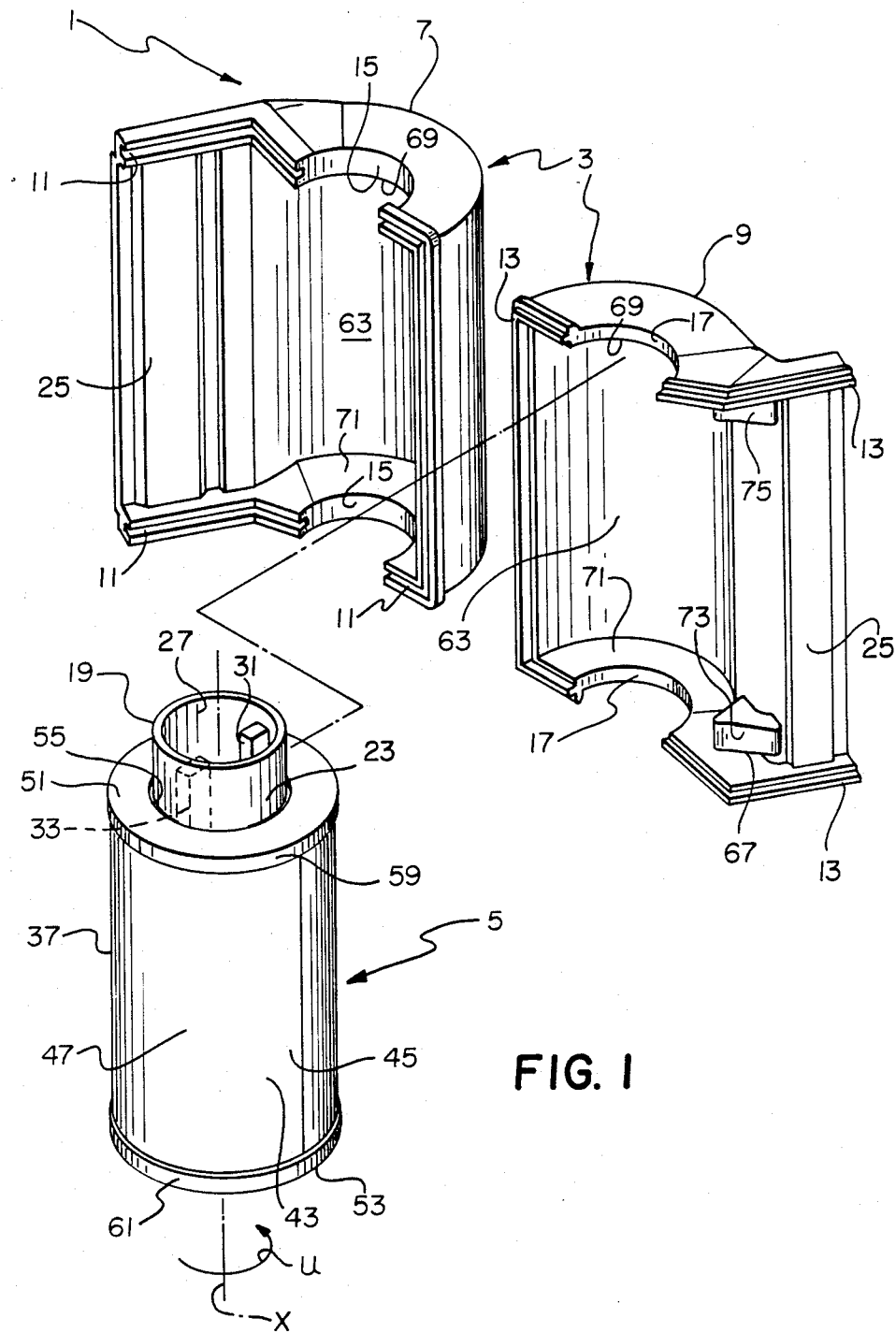
FIG. 1 is an exploded perspective view of an improved film cassette according to a preferred embodiment of the invention.
Figure 2:
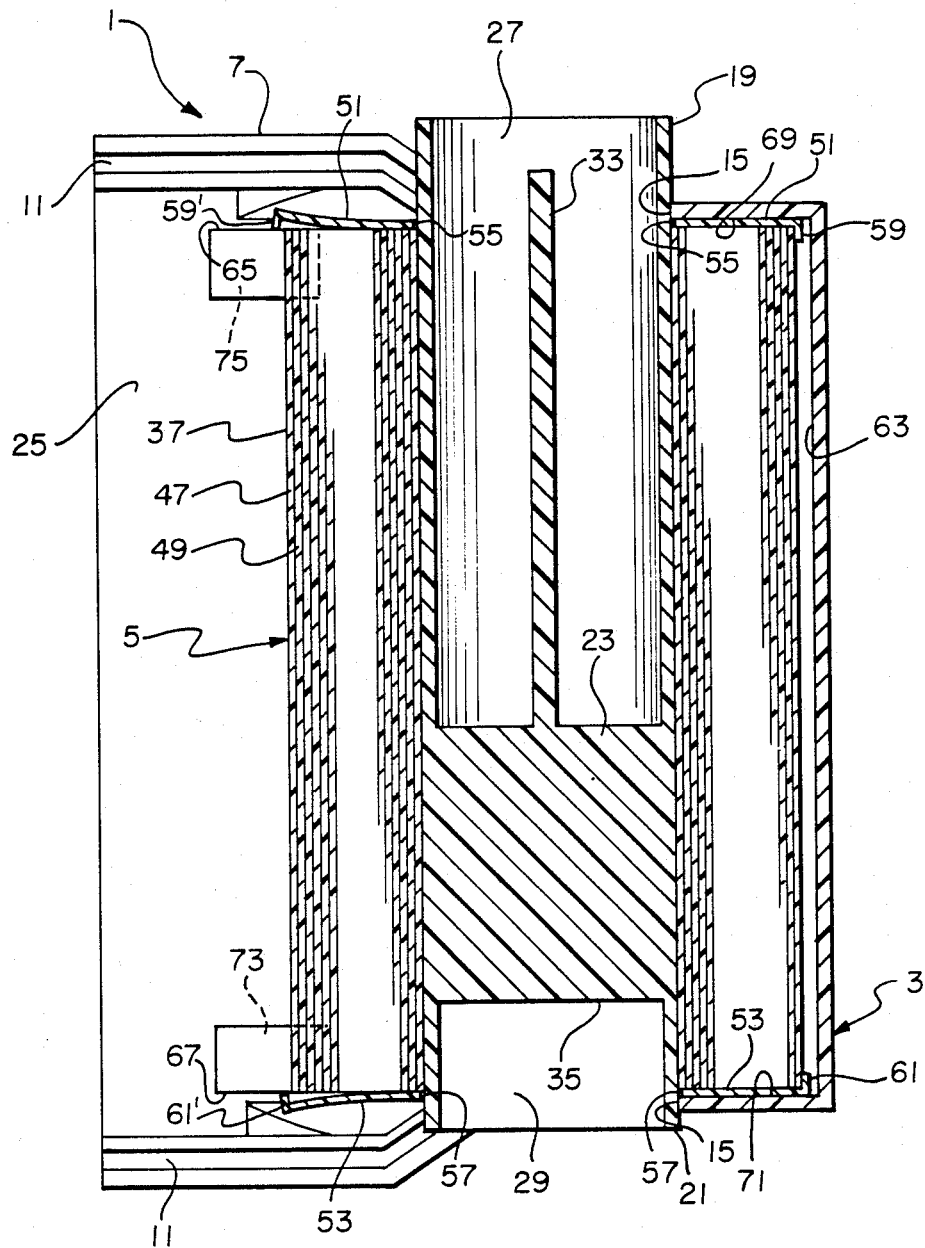
FIG. 2 is an elevation view in cross-section of the improved film cassette.
Figure 3:
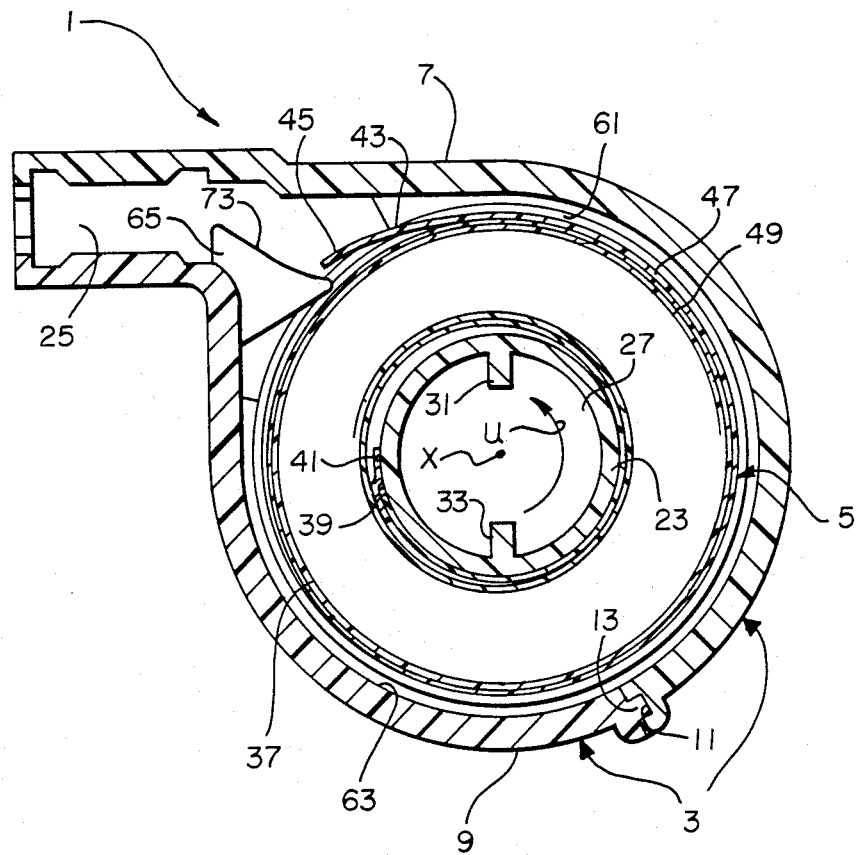
FIG. 3 is an end view in cross-section of the improved film cassette.

Referring now to the drawings, FIGS. 1-3 depict an improved 35 mm film cassette 1 comprising a light-tight cassette shell 3 and a film spool 5 rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-tapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direciton indicated by the arrow U in FIG. 1, or to rotate the spool in a winding direction opposite to the unwinding direction.

A roll 37 of convoluted 35 mm flim having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

A pair of flexible identical disks 51 and 53 are coaxially spaced along the spool core 23 to lightly rest against the opposite ends of the film roll 37. The two disks 51 and 53 cover the opposite ends of the film roll 37 and they have respective central holes 55 and 57 through which the spool core 23 longitudinally extends to permit rotation of the spool core relative to the disks. Although not shown, it is possible for the spool core 23 to include integral radially extending flanges disposed between the opposite ends of the film roll 37 and the respective disks 51 and 53. The two disks 51 and 53 have respective continuous circumferential lips 59 and 61 which extend at right angles to the peripheries of the disks to radially confine the outermost convolution 47 of the film roll 37, thereby to prevent the film roll from radially expanding or clock-springing into contact with an inner wall 63 of the cassette shell 3. As shown in FIG. 1, the leading end 45 of the film roll 37 is similarly confined by the circumferential lips 59 and 61. However, the leading end 45 may be tapered to allow it to slightly protrude from between the two lips 59 and 61.

A pair of rigid identical spreader surfaces 65 and 67 are fixed to the cassette half 9 at separate locations inwardly of the film passage slit 25 as shown in FIGS. 2 and 3. The two spreader surfaces 65 and 67 deflect opposite limited sections 59' and 61' of the respective lips 59 and 61 axially away from each other to an axial dimension slightly exceeding the film width. See FIG. 2. In essence, the deflected sections 59' and 61' of the two lips 59 and 61 are axially spaced sufficiently to prevent those sections of the lips from radially confining corresponding sections of the outermost convolution 47 of the film roll 37. As indicated in FIGS. 1 and 2, the remaining portions of the two lips 59 and 61 are maintained in place by inner semi-circular flat surfaces 69 and 71 of the cassette shell 3 which abut the respective disks 51 and 53, except in the vicinity of the two spreader surfaces 65 and 67. Thus the remaining portions of the two lips 59 and 61 continue to radially confine the outermost convolution 47.

OPERATION

When the spool core 23 is initially rotated in the unwinding direction U, the two disks 51 and 53 may remain substantially stationary and the film roll 37, since its inner end 39 is attached to the spool core, tends to expand radially to ensure a non-slipping relation between the outermost convolution 47 of the film roll and the circumferential lips 59 and 61 of the disks. Then, rotation of the spool core 23 in the same direction will similarly rotate the two disks 51 and 53. As a result, the two spreader surfaces 65 and 67 will deflect successive sections of the circumferential lips 59 and 61 axially away from each other as the respective sections are rotated past the spreader surfaces. The deflected sections of the two lips 59 and 61 are returned to their original non-flexed condition by the semi-circular flat surfaces 69 and 71. As can be appreciated from FIG. 3, the leading end 45 of the film roll 37 will be freed from the radial confinement of the two lips 59 and 61 in the vicinity of the two spreader surfaces 65 and 67 and it will be advanced against a pair of rigid identical stripper-guide surfaces 73 and 75 integrally formed with the respective spreader surfaces. The two stripper-guide surfaces 73 and 75 operate to direct the leading end 45 into the film passage slit 25, thereby allowing succeeding sections of the outermost convolution 47 to be freed from corresponding sections of the two lips 59 and 61 as those sections of the lips are deflected by the two spreader surfaces 65 and 67. Consequently, continued rotation of the spool core 23 will thrust the film leader 43 from the cassette shell 3.

The invention has been described with reference to a preferred embodiment. However, it will be appreciated that variations and modifications can be effected within the ordinary skill in the art without departing from the scope of the invention. For example, the leading end 45 of the film roll 37 could initially be located within the film passage slit 25 rather than be radially confined by the circumferential lips 59 and 61 of the two disks 51 and 53.

We claim:

1. An improved film cassette wherein (a) a spool is rotatable in an unwinding direction within a cassette shell having a film passage slit and (b) a convoluted film roll wound on said spool has an inner end attached to the spool, and wherein the improvement comprises:

rotatable constraining means for radially confining an outermost convolution of said film roll to prevent said outermost convolution substantially from contacting said cassette shell, said constraining means being coaxially arranged with respect to said spool to permit independent rotation of the spool in the unwinding direction to urge said film roll to ensure a non-slipping relation between said outermost convolution and the constraining means and thereby enable further rotation of said spool in the unwinding direction to similarly rotate said constraining means;

release means for freeing successive sections of said outermost convolution from the radial confinement of said constraining means as corresponding portions of the constraining means are rotated past said release means; and guide means for directing freed sections of said outermost convolution to said film passage slit.

2. An improved film cassette wherein (a) a spool is rotatable in an unwinding direction within a cassette shell having a film passage slit and (b) a convoluted film roll wound on said spool tends to expand radially in response to initial rotation of the spool in the unwinding direction, and wherein the improvement comprises:

rotatable constraining means for radially confining an outermost convolution of said film roll to prevent the film roll from radially expanding substantially into contact with said cassette shell, said constraining means being coaxially arranged with respect to said spool to permit independent rotation of the spool at least initially in the unwinding direction to tend to expand said film roll radially to ensure a non-slipping relation between said outermost convolution and said constraining means and thereby enable further rotation of said spool in the unwinding direction to similarly rotate the constraining means;

release means for freeing successive sections of said outermost convolution from the radial confinement of said constraining means as corresponding portions of the constraining means are rotated past said release means; and guide means for directing freed sections of said outermost convolution to said film passage slit.

3. The improvement as recited in claim 2, wherein said constraining means is capable of being flexed to free said outermost convolution of the film roll from the radial confinement of the constraining means, and said release means directly flexes successive portions of said constraining means to free corresponding sections of said outermost convolution as those portions of the constraining means are rotated past the release means.

4. The improvement as recited in claim 3, further comprising:

support means for securing said constraining means in a non-flexed condition as it is rotated, except at the particular portion of the constraining means flexed by said release means.

5. The improvement as recited in claim 3, wherein said constraining means includes a rotatable disk coaxially disposed with respect to said spool and having a continuous circumferential lip which contains said outermost convolution of the film roll to radially confine the outermost convolution.

6. The improvement as recited in claim 5, wherein said outermost convolution of the film roll has a leading end, and said circumferential lip contains said leading end to radially confine the leading end.

7. The improvement as recited in claim 2, wherein said outermost convolution of the film roll is a film leader having the same width as the remainder of said film roll and having a leading end located within said cassette shell, and said constraining means radially confines said leading end.

8. An improved film cassette wherein (a) a spool is rotatable within a cassette shell having a film passage slit and (b) a convoluted film roll having a leading end is wound on said spool, and wherein the improvement comprises:

rotatable constraining means for substantially continuously confining an outermost convolution of said film roll including its leading end to prevent the film roll completely from contacting said cassette shell, said constraining means capable of being flexed to free said outermost convolution including said leading end from the confinement of the constraining means;

rigid fixed release means for directly flexing successive portions of said constraining means to free corresponding sections of said outermost convolution from the confinement of the constraining means as those portions of said constraining means are rotated past said release means; and guide means for directing freed sections of said outermost convolution to said film passage slit.

9. The improvement as recited in claim 8, wherein said release means is disposed in continuous contact with said constraining means to always flex one portion of the constraining means.

10. The improvement as recited in claim 8, further comprising:

rigid fixed support means bearing against said constraining means as it is rotated, for preventing flexing of the constraining means except substantially in the vicinity of said flexing means.

11. An improved film cassette wherein (a) a spool is rotatable within a cassette shell having a film passage slit and (b) a convoluted film roll is wound on said spool, and wherein the improvement comprises:

rotatable constraining means for radially confining an outermost convolution of said film roll to prevent the film roll from contacting said cassette shell, said constraining means capable of being flexed to free said outermost convolution from the radial confinement of the constraining means;

rigid fixed release means disposed in continuous contact with said constraining means for directly flexing successive portions of the constraining means to free corresponding sections of said outermost convolution from the radial confinement of said constraining means as those portions of said constraining means are rotated past said release means; and guide means for directing freed sections of said outermost convolution to said film passage slit.

12. An improved film cassette wherein (a) a spool is rotatable in an unwinding direction within a cassette shell having a film passage slit and (b) a convoluted film roll wound on said spool tends to expand radially in response to initial rotation of said spool in the unwinding direction, and wherein the improvement comprises:

a pair of rotatable disks coaxially spaced along said spool and having respective central holes through which the spool extends to permit rotation of said spool relative to said disks, said disks including respective continuous circumferential lips which radially confine an outermost convolution of said film roll both to prevent the film roll from radially expanding substantially into contact with said cassette shell and to ensure a non-slipping relation with said outermost convolution, when the film roll tends to expand radially in response to initial rotation of said spool in the unwinding direction, to thereby enable further rotation of the spool in the same direction to similarly rotate the disks;

release means for freeing successive sections of said outermost convolution from the radial confinement of said circumferential lips as corresponding portions of the lips are rotated past said release means; and guide means for directing freed sections of said outermost convolution to said film passage slit.

13. The improvement as recited in claim 12, wherein said circumferential lips of the disks are capable of being flexed to free said outermost convolution of the film roll from the radial confinement of the lips, and said release means includes rigid fixed means for directly flexing successive portions of said circumferential lips to free corresponding sections of said outermost convolution as those portions of the lips are rotated past said flexing means.

14. An improved film cassette wherein (a) a spool is rotatable in an unwinding direction within a cassette shell having a film passage slit and (b) a convoluted film roll wound on said spool has an inner end attached to the spool, and wherein the improvement comprises:

rotatable constraining means for radially confining an outermost convolution of said film roll to prevent said outermost convolution substantially from contacting an interior wall of said cassette shell, said constraining means being arranged with respect to said spool to permit rotation of the spool relative to the constraining means in the unwinding direction to urge said film roll to ensure a non-slipping relation between said outermost convolution and said constraining means and thereby enable further rotation of said spool in the unwinding direction to similarly rotate the constraining means.

15. An improved film cassette wherein (a) a spool is rotatable in an unwinding direction within a cassette shell having a film passage slit and (b) a convoluted film roll wound on said spool has an inner end attached to the spool to cause said film roll to tend to expand radially in response to initial rotation of said spool in the unwinding direction, and wherein the improvement comprises:

a pair of rotatable disks coaxially spaced along said spool and having respective central holes through which the spool longitudinally extends to permit initial rotation of said spool relative to said disks in the unwinding direction, said disks including respective circumferential lips which radially confine an outermost convolution of said film roll both to prevent the film roll from radially expanding substantially into contact with an interior wall of said cassette shell and to ensure a non-slipping relation with said outermost convolution, when the film roll tends to expand radially in response to initial rotation of said pool relative to the disks in the unwinding direction, to thereby enable further rotation of the spool in the same direction to similarly rotate the disks.

* * * * *